(12) United States Patent
Chatterton et al.

(10) Patent No.: US 11,245,222 B2
(45) Date of Patent: Feb. 8, 2022

(54) SUBSEA INTERCONNECTION SYSTEM

(71) Applicant: SIEMENS ENERGY AS, Oslo (NO)

(72) Inventors: Nicholas Chatterton, Ulverston (GB); Richard Lewin, Ulverston (GB); Christopher Plant, Lancaster (GB)

(73) Assignee: SIEMENS ENERGY AS, Oslo (NO)

(*) Notice: Subject to any disclaimer, the term of this patent is extended or adjusted under 35 U.S.C. 154(b) by 47 days.

(21) Appl. No.: 16/493,484

(22) PCT Filed: Mar. 7, 2018

(86) PCT No.: PCT/EP2018/055636
§ 371 (c)(1),
(2) Date: Sep. 12, 2019

(87) PCT Pub. No.: WO2018/166871
PCT Pub. Date: Sep. 20, 2018

(65) Prior Publication Data
US 2021/0159636 A1   May 27, 2021

(30) Foreign Application Priority Data
Mar. 17, 2017 (EP) ..................................... 17161589

(51) Int. Cl.
*H01R 11/30* (2006.01)
*H01R 13/62* (2006.01)
(Continued)

(52) U.S. Cl.
CPC ......... *H01R 13/6205* (2013.01); *H01R 13/04* (2013.01); *H01R 13/523* (2013.01); *H01R 13/5213* (2013.01); *H01R 43/26* (2013.01)

(58) Field of Classification Search
CPC ................ H01R 13/6205; H01R 13/04; H01R 13/5213; H01R 13/523; H01R 43/26; H02K 7/09; H02K 49/102; H01F 7/122
(Continued)

(56) References Cited

U.S. PATENT DOCUMENTS 3,958,842 A * 5/1976 Telle .................... F16C 32/0425
310/90.5
4,072,370 A * 2/1978 Wasson ............... F16C 32/0425
310/90.5
(Continued)

FOREIGN PATENT DOCUMENTS

EP          3086414 A1    10/2016

OTHER PUBLICATIONS

PCT International Search Report of International Searching Authority dated Jun. 6, 2018 corresponding to PCT International Application No. PCT/EP2018/055636 filed Jul. 3, 2018.
(Continued)

*Primary Examiner* — Thanh Tam T Le
(74) *Attorney, Agent, or Firm* — Wolter Van Dyke Davis, PLLC (57) ABSTRACT

An arrangement is for releasable interconnection. In an embodiment, the arrangement includes an outer ring having an inner diameter; and an inner ring having an outer diameter not greater than the inner diameter of the outer ring. One of the outer ring and the inner ring includes at least a first magnet ring and a second magnet ring, spaced apart in an axial direction leaving an axial space there between. The other of the outer ring and the inner ring includes at least one third magnet ring. The first and the second magnet rings are oriented such that same magnetic poles face each other.

23 Claims, 8 Drawing Sheets

(51) Int. Cl.
*H01R 13/04* (2006.01)
*H01R 13/52* (2006.01)
*H01R 13/523* (2006.01)
*H01R 43/26* (2006.01)

(58) Field of Classification Search
USPC ............ 439/38, 39; 335/229; 310/90.5, 103
See application file for complete search history.

(56) References Cited

U.S. PATENT DOCUMENTS

| | | | | |
|---|---|---|---|---|
| 4,568,898 | A | 2/1986 | Spinner | |
| 5,196,748 | A * | 3/1993 | Rigney | F16C 32/0438 |
| | | | | 310/90.5 |
| 5,710,469 | A * | 1/1998 | Ries | F16C 32/0438 |
| | | | | 310/90.5 |
| 6,501,357 | B2 * | 12/2002 | Petro | H02K 33/16 |
| | | | | 335/229 |
| 6,798,095 | B2 * | 9/2004 | Steinmeyer | F16C 32/0438 |
| | | | | 310/58 |
| 6,831,384 | B2 * | 12/2004 | Ries | H02K 7/09 |
| | | | | 310/90.5 |
| 6,833,643 | B2 * | 12/2004 | Beyer | F04D 19/048 |
| | | | | 310/90.5 |
| 6,841,910 | B2 * | 1/2005 | Gery | H02K 49/106 |
| | | | | 310/103 |
| 7,002,273 | B2 * | 2/2006 | Schippl | F01D 25/16 |
| | | | | 310/90.5 |
| 7,265,470 | B1 * | 9/2007 | Paden | F16F 6/005 |
| | | | | 310/103 |
| 7,276,828 | B2 * | 10/2007 | Yeh | F04D 29/058 |
| | | | | 310/67 R |
| 8,446,060 | B1 * | 5/2013 | Lugg | F02C 3/113 |
| | | | | 310/156.22 |
| 9,059,627 | B2 * | 6/2015 | Englert | H02K 49/102 |
| 9,735,637 | B2 * | 8/2017 | Akamatsu | H02K 21/222 |
| 10,030,701 | B2 * | 7/2018 | Helgesen | F16C 32/0423 |
| 10,995,765 | B2 * | 5/2021 | Sato | F04D 29/041 |
| 2010/0013333 | A1 * | 1/2010 | Vollmer | H02K 49/106 |
| | | | | 310/103 |
| 2010/0308601 | A1 * | 12/2010 | Walden | H02K 53/00 |
| | | | | 290/1 R |
| 2011/0306225 | A1 | 12/2011 | Chaize | |

OTHER PUBLICATIONS

Written Opinion of International Searching Authority dated Jun. 6, 2018 corresponding to PCT International Application No. PCT/EP2018/055636 filed Jul. 3, 2018.

* cited by examiner

SUBSEA INTERCONNECTION SYSTEM

PRIORITY STATEMENT

This application is the national phase under 35 U.S.C. § 371 of PCT International Application No. PCT/EP2018/055636, which has an International filing date of Mar. 7, 2018, which designated the United States of America and which claims priority to European Patent Application No. EP 17161589.1 filed Mar. 17, 2017, the entire contents of which are hereby incorporated herein by reference.

FIELD

Embodiments of the present application generally relate to an arrangement and a method for releasable interconnection, in particular for a subsea operation, further relates to a cap for protecting a subsea electrical connector, relates to a system and further relates to a sprung connector member for interconnection with another electrical connector member. Further, embodiments of the present application generally relate to the present invention relates to a subsea connector system and to a method for establishing a releasable interconnection.

BACKGROUND

U.S. Pat. No. 4,568,898 discloses a short-circuit device having an inner conductor which is surrounded by an outer conductor and is electrically connected to the latter by a shorting plunger. Transmitting a movement of a first carriage to a second carriage is provided by magnets respectively accommodated by the first and second carriages and polarized in an opposing manner so as to cause an attractive force between the carriages.

EP 3 086 414 A1 discloses a connector unit for connecting at least two cables, comprising at least a male part, a female part and a shuttle piston, wherein the shuttle piston comprises at least one magnetic connecting device for establishing a magnet connection between the shuttle piston and at least one magnetic connecting aid of the male part.

US 2011/0306225 A1 discloses a wet-mateable connector for making a connection underwater comprising a male component having a male pin and a female component having a female socket for receiving the male pin.

During a subsea operation, such as an oil exploration or gas exploration operation, it may be required to perform releasable electrical connections between different equipment members, such as pumps, electrical distribution cables and so on.

Occasionally, some of the subsea equipment may be idle and may therefore not be electrically connected to any other subsea equipment. For example, some subsea equipment may be stored on the seabed for a long period of times, such as for several years, in particular about 2 or 3 years. During this idle time or storage time at the seabed, the electrical connector of the subsea equipment may be required to be protected from the harsh environment involving the salty seawater.

Thus, a subsea protective plug may be required for the receptacle front end of some subsea equipment. In particular, the receptacle (also referred to as subsea electrical connection member) could be stored on the seabed for up to 2 years between uses. The purpose of the protective plug is to protect the receptacle during this storage period. The plug may be required to be mated/demated at the subsea exploration site using a remotely operated vehicle (ROV). Thereby, the mating/demating latching forces must be sufficient to allow the ROV interaction but also to hold the plug in place until the live connection is required. In particular, a one shot method involving one directional force until the plug is fully mated/secured or released and demated may be required for the protective cap to be most efficient. This may require a latching mechanism that may give a known and repeatable latching force using just the movement of the receptacle along the axis of the protective plug (also referred to as dummy plug).

Issues with external latches are that the subsea is a very harsh environment, in particular for moving parts. Marine growth, calcareous growth (calcium carbonate) and corrosion are all issues. Therefore, any moving parts exposed to seawater must be simple and robust. Ideally, moving components should be in a protected environment.

In conventional methods, external mechanical latches may have been employed with possible twist and latch movement or two stage latching/locking methods.

However, it has been observed that the conventional latching or interconnection methods may not in all conditions enable or ensure a reliable interconnection, in particular effectively protecting electrical contacts from the harsh sea environment.

SUMMARY

Thus, the inventors have discovered that there may be a need for an arrangement for releasable interconnection, in particular at the seabed, for a (protective) cap to protect a subsea electrical connection member.

Advantageous embodiments of the present application are described by the claims.

According to an embodiment of the present application, an arrangement is provided an arrangement for releasable interconnection, comprising: an outer ring having an inner diameter; and an inner ring having an outer diameter being not greater than the inner diameter of the outer ring, wherein one of the outer ring and the inner ring comprises at least a first magnet ring and a second magnet ring being spaced apart in an axial direction leaving an axial space there between, wherein the other of the outer ring and the inner ring comprises at least one third magnet ring, wherein the first and the second magnet rings are oriented such that same magnetic poles face each other, wherein when the third magnet ring is arranged between the first and the second magnet rings substantially in the axial space: one pole of the third magnet ring is closer to a same pole of the second magnet ring than to a different pole of the second magnet ring, and the other pole of the third magnet ring is closer to a different pole of the first magnet ring than to a same pole of the first magnet ring.

According to an embodiment of the present application, a cap is provided for protecting a subsea electrical connector, comprising: an arrangement according to one of the preceding embodiments; a substantially cylindrical casing having a chamber fillable with oil, wherein the first and second magnet rings are fixed at the casing; a shuttle pin translatable within the chamber in the axial direction and having at one end an interconnection magnet (e.g. interconnection force>1000 N) for interconnection to a pin of a subsea electrical connector, wherein the third magnet ring is fixed at the shuttle pin.

According to an embodiment of the present application, a system comprising a cap according to one of the preceding embodiments and a subsea electrical connector member is provided, wherein the subsea electrical connector has a pin arranged to interconnect with the interconnection magnet of the shuttle pin of the cap upon contact there between.

According to an embodiment of the present application, it is provided a sprung connector member for interconnection with another electrical connector member, comprising: a casing; a shuttle pin for electrical connection translatable within the casing; a coil spring for biasing the shuttle pin; and an arrangement for releasable interconnection according to one of the preceding embodiments, wherein the first and second magnet rings are fixed at the casing and the third magnet ring is fixed at the shuttle pin, wherein a holding force between the third magnet ring and the first and second magnet rings, when the third magnet ring is in the axial space, is directed opposite to a spring force acting on the shuttle pin.

According to an embodiment of the present application, a method is provided for establishing a releasable interconnection between an outer ring having an inner diameter and an inner ring having an outer diameter being not greater than the inner diameter of the outer ring, wherein one of the outer ring and the inner ring comprises at least a first magnet ring and a second magnet ring being spaced apart in an axial direction leaving an axial space there between, wherein the other of the outer ring and the inner ring comprises at least one third magnet ring, wherein the first and the second magnet rings are oriented such that same magnetic poles face each other, the method comprising: arranging the third magnet ring between the first and the second magnet rings substantially in the axial space such that: one pole of the third magnet ring is closer to a same pole of the second magnet ring than to a different pole of the second magnet ring, and the other pole of the third magnet ring is closer to a different pole of the first magnet ring than to a same pole of the first magnet ring.

BRIEF DESCRIPTION OF DRAWINGS

Embodiments of the present application are now described with reference to the accompanying drawings. The invention is not restricted to the illustrated or described embodiments.

DETAILED DESCRIPTION OF THE EXAMPLE EMBODIMENTS

According to an embodiment of the present invention, an arrangement is provided an arrangement for releasable interconnection, comprising: an outer ring having an inner diameter; and an inner ring having an outer diameter being not greater than the inner diameter of the outer ring, wherein one of the outer ring and the inner ring comprises at least a first magnet ring and a second magnet ring being spaced apart in an axial direction leaving an axial space there between, wherein the other of the outer ring and the inner ring comprises at least one third magnet ring, wherein the first and the second magnet rings are oriented such that same magnetic poles face each other, wherein when the third magnet ring is arranged between the first and the second magnet rings substantially in the axial space: one pole of the third magnet ring is closer to a same pole of the second magnet ring than to a different pole of the second magnet ring, and the other pole of the third magnet ring is closer to a different pole of the first magnet ring than to a same pole of the first magnet ring.

The outer ring and/or the inner ring may in particular be circular rings. The inner ring may be slit at least partly into the outer ring. The outer ring and the inner ring may be translatable relative to each other in the axial direction, being in particular perpendicular to a plane defined by the outer ring or the inner ring. The magnet rings (i.e. the first, the second and the third magnet rings) may comprise each one or several magnets arranged in a circumferential direction. According to a particular embodiment, the first and/or second and/or third magnet rings each comprises a single continuous ring magnet. A north pole or a south pole may be on a first front face and a south pole or a north pole may be on a second front face.

The first magnet ring and the second magnet ring may substantially be of identical construction, however oriented such that same magnet poles face each other. In particular, the first magnet ring, the second magnet ring and the third magnet ring may substantially be parallel to each other (even during relative translation of the third magnet ring). The first magnet ring and the second magnet ring may have a fixed axial spacing relative to each other. The third magnet ring is translatable relative to the first and the second magnet rings. The third magnet ring may be translated to be arranged substantially in the axial space to establish an (magnetic) interconnection between the outer ring and the inner ring. When the third magnet ring is arranged between the first and the second magnet rings substantially in the axial space, the third magnet is held by a holding force due to magnetic interaction between the first magnet ring and the third magnet ring and also due to a magnetic interaction between the second magnet ring and the third magnet ring. The holding force may only act in one direction, in particular pointing from the second magnet ring to the first magnet ring and being exerted on the third magnet ring. By proper selection of the size and material of the magnet rings, the magnitude of the holding force may be adjusted properly according to the requirements of the particular application.

Embodiments of the present invention have some advantages: the arrangement of the pair of magnets may allow the latching force (between the third magnet ring on one hand and the first and second magnet rings on the other hand) to be maintained over a long distance to allow for mechanical size differences along with changes in length with temperature. If a single outer magnet (instead of a first and second magnet) was used the latching effect would exist but the force would be highly non-linear with relative position of the magnets dropping off to a negligible level over 5-10 mm. With the pair of magnets (first and second magnet ring) spaced apart in the axial direction, as the repulsive force from one magnet drops the attractive force from the other increases. By using this effect the length over which the latching force is applied is increased to ~20-25 mm and it may be nearly constant in this region. Thus, the arrangement of the first and second magnet rings being spaced apart and arranging a third magnet ring as specified, may allow for a substantially constant holding force over a relatively large axial distance.

According to an embodiment of the present invention, the north poles of the first and second magnet rings face each other, wherein, when in the axial space, the third magnet ring is arranged such that the north pole of the third magnet ring is closer to the north pole of the second magnet ring than to the south pole of the second magnet ring, the south pole of the third magnet ring is closer to the north pole of the first magnet ring than to the south pole of the first magnet ring.

According to an embodiment of the present invention, the south poles of the first and second magnet rings face each other, wherein, when in the axial space, the third magnet ring is arranged such that the north pole of the third magnet ring is closer to the south pole of the first magnet ring than to the north pole of the first magnet ring, the south pole of the third magnet ring is closer to the south pole of the second magnet ring than to the north pole of the second magnet ring.

Thereby, the two possible orientations of the three magnet rings in the magnetic latch are provided. One or the other orientation may be selected based on other (magnetic) elements comprised in the equipment to be connected.

According to an embodiment of the present invention, the outer ring comprises the first magnet ring and the second magnet ring wherein the inner ring comprises the third magnet ring.

According to another embodiment, the outer ring may comprise the third magnet ring while the inner ring comprises the first magnet ring and the second magnet ring.

According to an embodiment of the present invention, when the third magnet ring is substantially in the axial space, the third magnet ring is held by a magnet holding force relative to the first and second magnet rings pointing in the axial direction from the second magnet ring to the first magnet ring. Thereby, for example a protective cap can be held such as to protect an electrical contact, in particular electrical pin of a connector member. Alternatively, a holding force for establishing other electrical connections may be established.

According to an embodiment of the present invention, a cap is provided for protecting a subsea electrical connector, comprising: an arrangement according to one of the preceding embodiments; a substantially cylindrical casing having a chamber fillable with oil, wherein the first and second magnet rings are fixed at the casing; a shuttle pin translatable within the chamber in the axial direction and having at one end an interconnection magnet (e.g. interconnection force>1000 N) for interconnection to a pin of a subsea electrical connector, wherein the third magnet ring is fixed at the shuttle pin.

When the cap is mated with the subsea electrical connector, the oil may surround the pin of the subsea electrical connector for protecting the pin from seawater. The interaction between the interconnection magnet and the pin of the subsea electrical connector may be much greater (for example having interconnection force>1000 N) than the holding force exerted between the first magnet ring, second magnet ring and third magnet ring. For applying the cap to the subsea electrical connector, thus to mate the cap with the subsea electrical connector for protecting the pin of the subsea electrical connector, the cap and the subsea electrical connector may be translated relative to each other in the axial direction such that the pin of the subsea electrical connector contacts the shuttle pin of the cap, when the shuttle pin is arranged within the casing of the cap such that the third magnet ring is not within the axial space. The mating process may then involve to displace the shuttle pin in the direction towards the first magnet ring and the second magnet ring until the third magnet ring is substantially located within the axial space such that the holding force acts on the third magnet ring and thus also on the shuttle pin in the direction against withdrawing the shuttle pin.

For demating the cap from the subsea electrical connector, the pin of the subsea electrical connector may be withdrawn, while the pin of the subsea electrical connector is still connected to the shuttle pin by the interconnection magnets interacting with magnetic material comprised in the pin of the subsea electrical connector. Since the interconnection force between the interconnection magnet and the pin of the subsea electrical connector is larger (in particular between 1.5 times and 10 times larger) than the holding force within the first magnet ring, second magnet ring and the third magnet ring, the connection between the interconnection magnet (and thus the shuttle pin) and the pin of the subsea electrical connector is not released or broken during withdrawing the pin of the subsea electrical connector from the cap. However, the holding force between the first, second and third magnet rings may be overcome such as to translate the pin of the subsea electrical connector still connected to the shuttle pin out of the oil filled chamber of the cap.

The shuttle pin may then be withdrawn until a stop position is reached. Finally, when a still higher force is applied, the connection between the interconnection magnet (of the shuttle pin) and the pin of the subsea electrical connector is also broken, the demating may be completed.

According to an embodiment of the present invention, the cap further comprises a seal annularly arranged between the casing and the shuttle pin, to prevent water ingression from outside the cap into the chamber.

While in the stop (demated) position, the shuttle pin may be at least partly surrounded by the seal. During the mating, the shuttle pin moves towards the first and second magnet ring, in particular away from the seal, while the pin of the subsea electrical connector slides into the seal such as to be annularly surrounded by the seal for preventing further water ingression from the outside the cap into the chamber. Upon completion of the mating operation, at least a portion of the pin of the subsea electrical connector may be surrounded by the oil within the chamber of the cap. Thereby, the pin of the subsea electrical connector may effectively be protected from the harsh environment, in particular seawater. The seal may be manufactured from resilient material.

According to an embodiment of the present invention, the cap further comprises a diaphragm, partially delimiting the chamber, and arranged to compensate changes of a volume of the chamber, due to movement of the shuttle pin, due to temperature changes, and arranged to pressure compensate the chamber with an outside pressure.

The diaphragm may comprise a flexible material and may be tight for oil and water. During the mating operation of the cap with a subsea electrical connector, the diaphragm may bulge out due to the displacement of some oil from the chamber. When the outside pressure increases, for example due to plunging the cap into the sea at higher and higher depths, the diaphragm may bulge in, thereby the pressure of the oil within the chamber of the cap may have substantially a same pressure as the outside (hydrostatic) pressure.

According to an embodiment of the present invention, the cap further comprises a fourth magnet ring fixed at the casing and arranged to exert, by interaction with the third magnet ring, a holding force to the shuttle pin in the direction from the first magnet ring to the second magnet ring, when the shuttle pin is in an unmated state, not mated/connected with the electrical connector.

The fourth magnet may also define a stop position of the shuttle pin and may hold the shuttle pin in the stop position for preparation of another mating operation with another electrical connector. The fourth magnet ring in particular may have a similar or same construction as the third magnet ring and the magnetic orientation may be a same as the orientation of the third magnet ring. In particular, the fourth magnet ring may be close to the seal. The seal may be an elastomeric ring or O-ring. The magnet may be held in the material which houses the seal but not in the seal itself. Alternatively the forth magnet may be replaced by a ring of magnetic material such that the shuttle pin is held in place by the magnetic interaction between the third magnet and the magnetic material.

According to an embodiment of the present invention, a system comprising a cap according to one of the preceding embodiments and a subsea electrical connector member is provided, wherein the subsea electrical connector has a pin arranged to interconnect with the interconnection magnet of the shuttle pin of the cap upon contact there between.

Therein, the holding force between the first and second magnet rings and the third magnet ring may be lower than the interconnection force between the shuttle pin of the cap and the pin of the electrical connector member. Thereby, during a demating operation, while the pin of the subsea electrical connector is withdrawn from the cap, first, the holding force between the first and second magnet rings and the third magnet ring is overcome, while the shuttle pin is still connected with the pin of the subsea electrical connector due to the interconnection force provided by the interconnection magnet. This enables to withdraw the shuttle pin until it reaches the stop position (in particular comprising interaction with or of the third magnet ring with the fourth magnet ring).

According to an alternative embodiment of the present invention, the holding force between the first and second magnet rings and the third magnet ring is lower than the interconnection force between the shuttle pin of the cap and the pin of the electrical connector member.

Thereby, a force generated by the coil spring may be reduced by the magnetic force exerted between the first and second magnet rings and the third magnet rings acting in an opposite direction than the spiral spring force.

According to an embodiment of the present application, it is provided a sprung connector member for interconnection with another electrical connector member, comprising: a casing; a shuttle pin for electrical connection translatable within the casing; a coil spring for biasing the shuttle pin; and an arrangement for releasable interconnection according to one of the preceding embodiments, wherein the first and second magnet rings are fixed at the casing and the third magnet ring is fixed at the shuttle pin, wherein a holding force between the third magnet ring and the first and second magnet rings, when the third magnet ring is in the axial space, is directed opposite to a spring force acting on the shuttle pin.

Thereby the spring force acting in a direction of demating can partially be compensated by the magnetic force, thereby reducing the risk of breaking the electrical contact.

According to another alternative embodiment of the present invention it is provided a subsea connector system comprising: a plug; a receptacle; and an arrangement for releasable interconnection according to one of the preceding embodiments, configured to exert a holding force between the plug and the receptacle when they are mated.

It should be understood that features individually or in any combination disclosed, described, provided for an arrangement for releasable interconnection, for a cap, for a system or for a sprung connector member may also be applicable to a method for establishing a releasable interconnection according to an embodiment of the present invention and vice versa.

According to an embodiment of the present application, a method is provided for establishing a releasable interconnection between an outer ring having an inner diameter and an inner ring having an outer diameter being not greater than the inner diameter of the outer ring, wherein one of the outer ring and the inner ring comprises at least a first magnet ring and a second magnet ring being spaced apart in an axial direction leaving an axial space there between, wherein the other of the outer ring and the inner ring comprises at least one third magnet ring, wherein the first and the second magnet rings are oriented such that same magnetic poles face each other, the method comprising: arranging the third magnet ring between the first and the second magnet rings substantially in the axial space such that: one pole of the third magnet ring is closer to a same pole of the second magnet ring than to a different pole of the second magnet ring, and the other pole of the third magnet ring is closer to a different pole of the first magnet ring than to a same pole of the first magnet ring.

The method may in particular be performed at a bottom of a sea, in particular involving connecting a protective cap to a connection member having a receptacle pin to be protected from seawater.

The illustration in the drawings is in schematic form. It is noted that in different figures, similar or identical elements are provided with the same reference signs or with reference signs, which are different from the corresponding reference signs only within the first digit.

Figure 1:
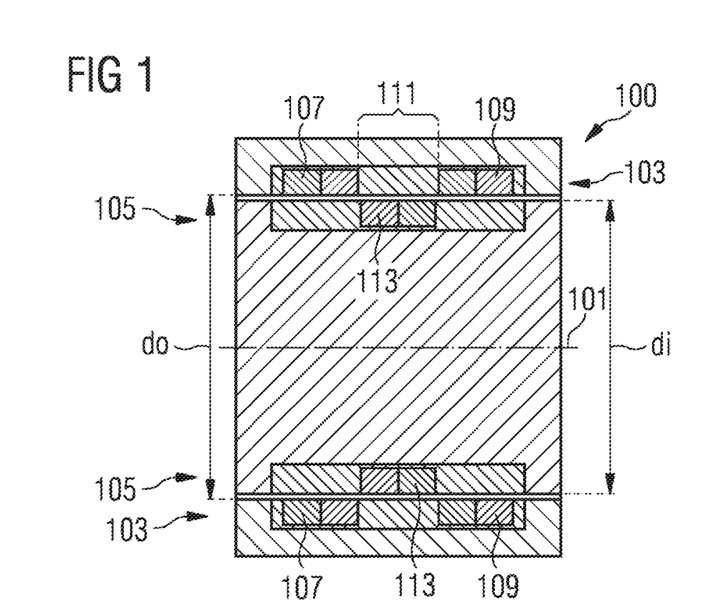
FIG. 1, 2 schematically illustrate a sectional view of an arrangement for releasable interconnection according to an embodiment of the present application.
Figure 2:
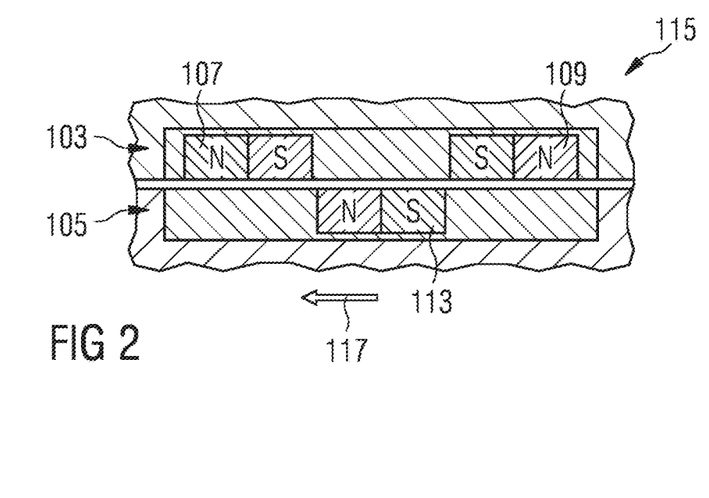

The arrangement 100 for releasable connection illustrated in FIG. 1, 2 in a sectional view shown perpendicular to an axial direction 101 comprises an outer ring 103 having an inner diameter 'di' and further comprises an inner ring 105 having an outer diameter 'do' which is not greater than the inner diameter 'di' of the outer ring 103. Thereby, the outer ring 103 comprises a first magnet ring 107 and a second magnet ring 109 which are spaced apart in the axial direction 101 leaving an axial space 111 there between. The inner ring 105 comprises a third magnet ring 113.

As is illustrated in more detail in the zoomed view 115, the first magnet ring and the second magnet ring 107, 109 are oriented such that the south poles (S) face each other. When the third magnet ring 113 is arranged between the first and the second magnet rings 107, 109 substantially in the axial space 111, the south pole (S) of the third magnet ring 113 is closer to the south pole of the second magnet ring 109 than to the north pole (N) of the second magnet ring 109. Further, the north pole (N) of the third magnet ring 113 is closer to the south pole of the first magnet ring 107 than to the north pole of the first magnet ring 107.

Figure 3:
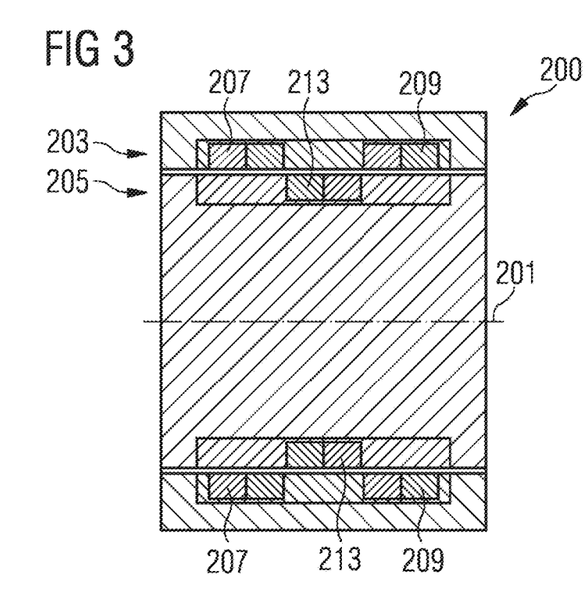
FIG. 3, 4 schematically illustrate a sectional view of an arrangement for releasable interconnection according to an embodiment of the present application.
Figure 4:
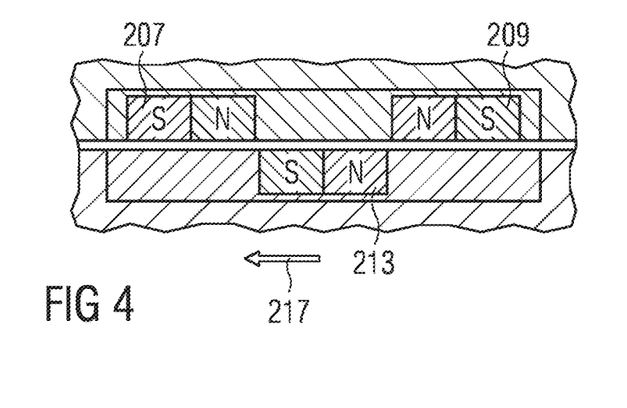

In FIG. 3, 4, another embodiment of an arrangement 200 for releasable interconnection is illustrated, wherein elements and structures similar or identical and structures and/or functions are labelled with the reference sign differing only in the first digit in comparison with those used in FIG. 1, 2. The embodiment 200 of the arrangement for releasable interconnection illustrated in FIG. 3, 4 differs from the one illustrated in FIG. 1, 2 only in the orientation of the first, the second and the third magnet rings 207, 209, 213. Herein, the north pole (N) of the third magnet ring 213 is closer to the north pole of the second magnet ring 209 than to the south pole of the second magnet ring 209. Further, the south pole of the third magnet ring 213 is closer to the north pole of the first magnet ring 207 than to the south pole of the first magnet ring 207.

When the third magnet ring 113 is substantially in the axial space 111 between the first magnet ring 107 and the second magnet ring 109, a magnet holding force 117, 217 acts in the axial direction 101, 201 pointing from the second magnet ring 109, 209 to the first magnet ring 107, 207. The holding force 117, 217 acts on the third magnet ring 113, 213 relative to the first and second magnet rings 107, 207, 109, 209.

Figure 5:
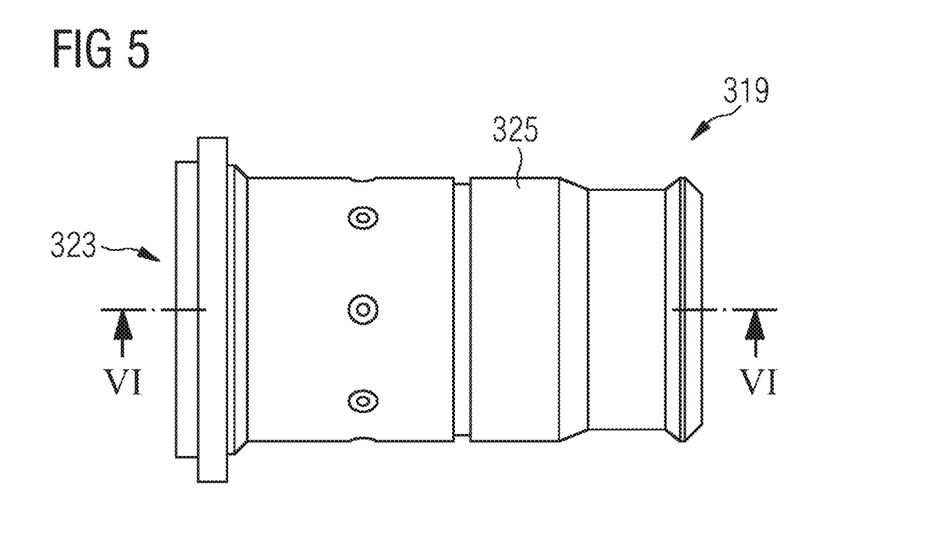
FIG. 5 schematically illustrates a protective cap in a side view and in FIG. 6 in a sectional side view according to an embodiment of the present application.
Figure 6:
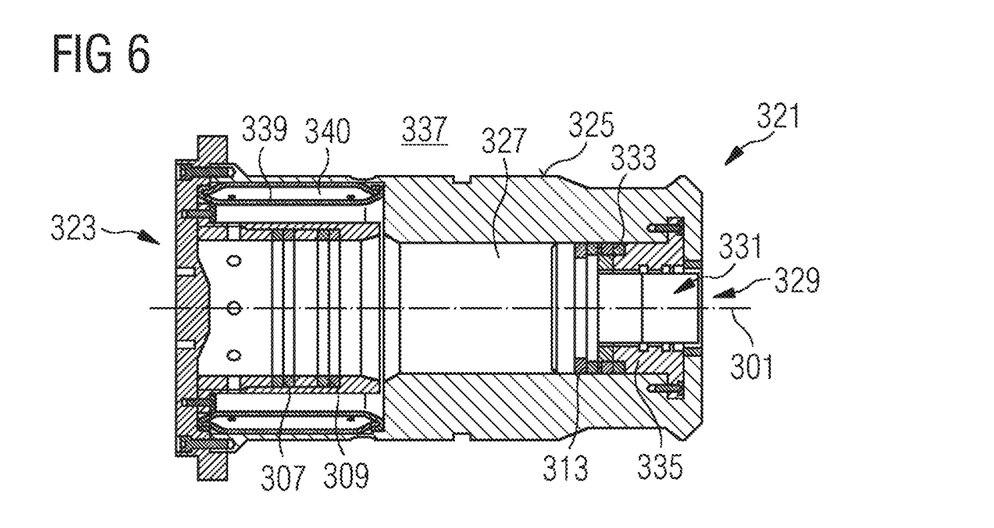

FIG. 5, 6 schematically illustrate in a side view 319 and in a sectional view 321 a cap 323 for protecting a subsea electrical connector according to an embodiment of the present invention which comprises an arrangement for releasable interconnection according to an embodiment of the present invention, for example one of the arrangements illustrated in FIG. 1, 2 or 3, 4.

The cap comprises a substantially cylindrical casing 325 having a chamber 327 which may be filled with oil. Further, the cap comprises a first magnet ring 307 and a second magnet ring 309 which are both fixed to the casing 325. The cap 323 further comprises a shuttle pin 329 which is translatable within the chamber along the axial direction 301 and which has at one end an interconnection magnet 331 (hidden internal magnet) for interconnection to a pin of a subsea electrical connector which will be explained with reference to the subsequent drawings. Further, the shuttle pin 329 has fixed thereto the third magnet ring 313. In a demated state, in which the protective cap 323 is not mated with a subsea electrical connector, as is illustrated in FIG. 5, 6, the third magnet ring 313 interacts with a fourth magnet ring 333 which is fixed at the casing 325 and arranged to exert, by interaction with the third magnet ring 313, a holding force at the shuttle pin 329 in the direction from the first magnet ring 307 to the second magnet ring 309.

The cap 323 further comprises a seal 335 which is annularly arranged between the casing 325 and the shuttle pin 329, to prevent water ingression from the outside 337 into the chamber 327. The cap 323 further comprises a diaphragm 339 which is partially delimiting the chamber and which is arranged to compensate changes of a volume of the chamber 327, due to movement of the shuttle pin 329, due to temperature changes and arranged to pressure compensate the chamber 327 with an outside pressure.

Figure 7:
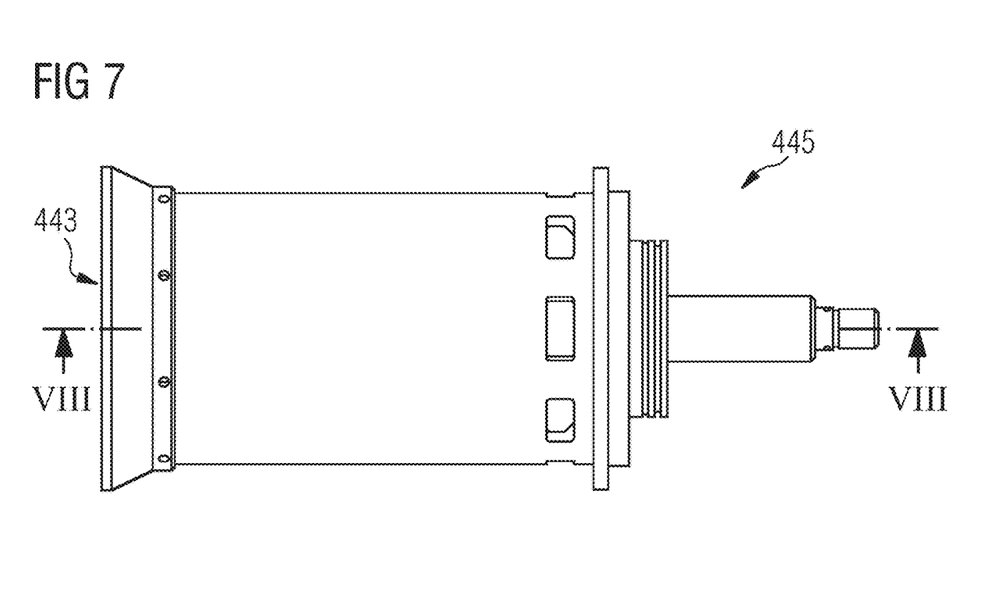
FIG. 7 schematically illustrates a subsea electrical connector (receptacle) in a side view and in FIG. 8 in a sectional view as is comprised in a system according to an embodiment of the present application.
Figure 8:
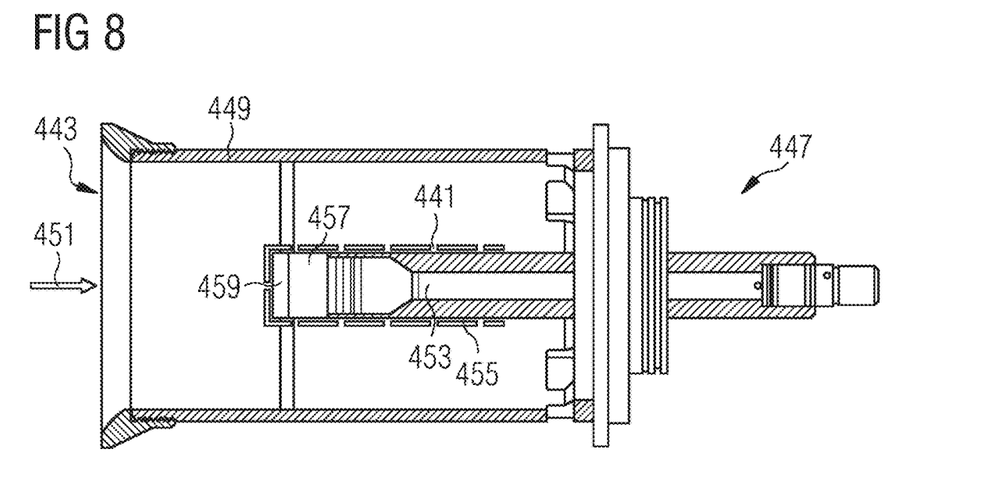

The cap illustrated in FIG. 5, 6 is capable of protecting a pin 441 of a subsea electrical connector 443 schematically illustrated in FIG. 7, 8 in a side view 445 and a sectional view 447 which may be comprised in a system according to an embodiment of the present invention together with the cap illustrated in FIG. 5, 6. The subsea electrical connector (also referred to as receptacle) 443 comprises a receptacle shroud 449 enclosing the pin 441 (also referred to as receptacle pin) which is to be protected from seawater which is allowed to enter the receptacle 443 via the opening 451 when the receptacle is not mated with another connector member of a subsea equipment. The receptacle 441 comprises a copper core 453 which is surrounded by a pin insulation 455. The receptacle pin 441 further comprises a copper contact area 457 having a magnetic tip (at least comprising ferromagnetic material, not necessarily being magnetized). During a normal connection with another electrical connector member, (the copper contact area 457 engages with a contact area (a multilam) in the connectors counterpart) of a connector member counterpart to establish an electrical connection there between.

The receptacle may be considered to be one half a wet-mate connector pair (the other half being the plug). It may consist of a shroud 449 which may provide a mechanical protection and aligns the receptacle to the plug during the mating stroke. The electrical connection may be made by way of the receptacle pin 441 which penetrates into the plug. The receptacle pin 441 has a conductive copper core 453 and a copper contact area 457 which is designed to interface with a contact area inside the plug. The receptacle also has a magnetic (not a magnet but will interact strongly with a magnet) tip 459.

The tip 459 may interface with the shuttle pin 329 of the cap 323 as illustrated in FIG. 5, 6. When the receptacle is unmated, the full receptacle pin 441 is exposed to seawater. Conventionally, the pin 441 may be designed to withstand the corrosive nature of seawater for a maximum of 30 days but it is designed to stay subsea for up to 30 years. Therefore, a protective cap or dummy plug is required to protect the receptacle pin 441, if it is to be stored unmated on the seabed for longer than 30 days (if it is mated to a plug the oil inside the plug protects the pin 441).

For this protection, the cap 323 illustrated in FIG. 5, 6 consists of a shell 325 with an internal oil filled chamber 327. The opening at the front of the protective cap (also referred to as dummy plug) is sealed by the magnetic shuttle pin 329 when the dummy plug is not mated to a receptacle. The shuttle pin 329 is retained in place at the front of the plug by the interaction between the front latch magnet (i.e. the fourth magnet ring 333) and the shuttle pin magnet (i.e. the third magnet ring 313). At the rear of the dummy plug 323, a flexible diaphragm 339 separates the oil from the seawater at the outside 337. The seawater chamber 340 around the diaphragm 339 is free flooding with seawater. The diaphragm has several purposes:

It may stretch to compensate the oil volume displaced when the receptacle is mated.

It provides compensation volumes to account for changes in oil volume due to changes in temperature.

It may transmit depth pressure from the seawater to the oil so that the internal of the dummy plug is pressure-compensated (i.e. same pressure as in the outside environment) and so may not be crushed by high pressures in deep water.

Figure 9:
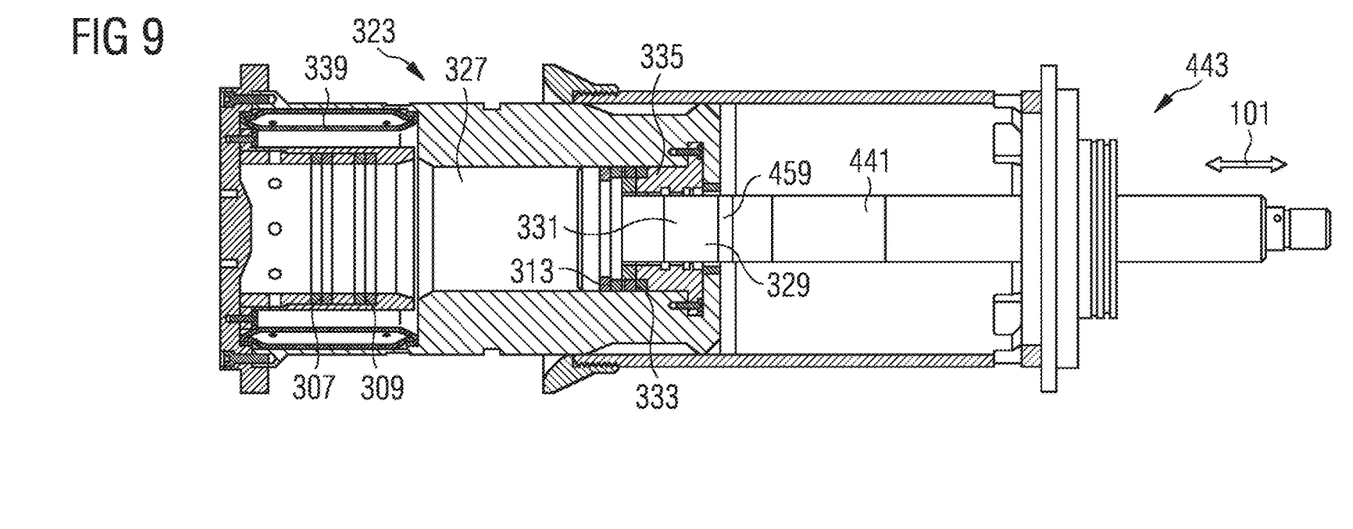
FIGS. 9 to 12 schematically illustrate steps in a mating process of the protective cap illustrated in FIG. 5, 6 with the subsea electrical connector illustrated in FIG. 7, 8.

FIGS. 9 to 12 schematically illustrate method steps during a mating operation for connecting the cap illustrated in FIG. 5, 6 with the subsea electrical connector (receptacle) illustrated in FIG. 7, 8. Thereby, FIG. 9 schematically illustrates the begin of the mating operation in which the magnetic tip 459 of the receptacle 443 reaches the shuttle pin 329 of the protective cap 323, wherein the shuttle pin 329 has already slightly been pushed in, as the receptacle 443 begins its mating stroke. Thereby, the receptacle pin 441 (in particular the magnetic tip 449 of the receptacle pin 441) is latched to the interaction magnet 331 of the shuttle pin 329. This holds the receptacle pin 441 and the shuttle pin 329 together, e.g. with a force of >1000 N.

Figure 10:
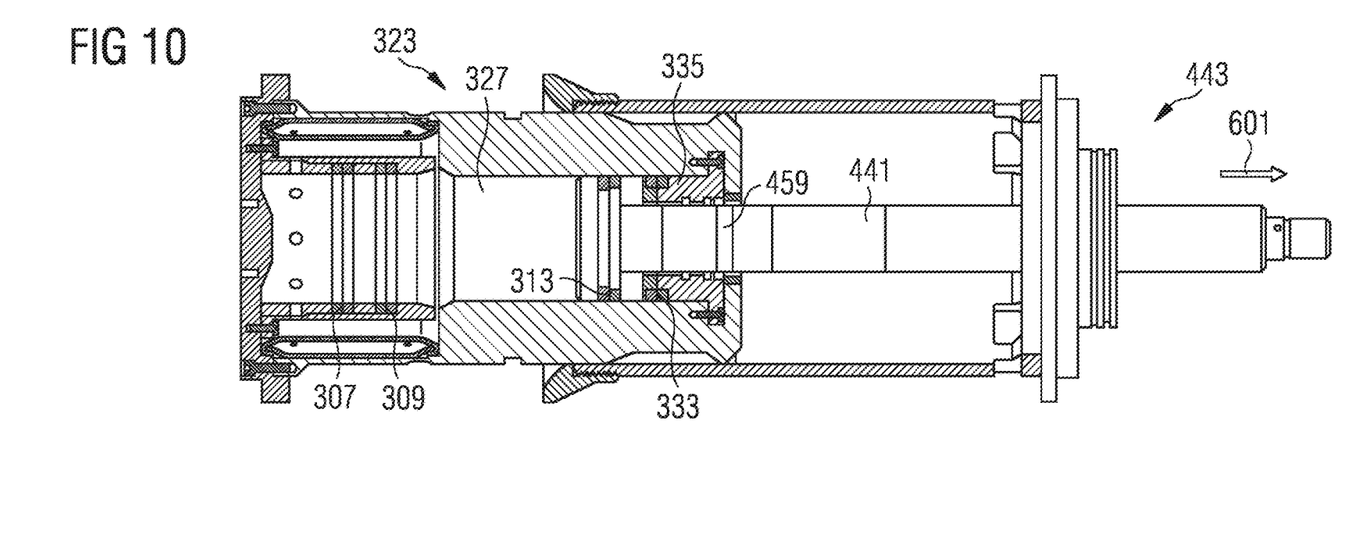

Thereby, as is illustrated in FIG. 10, the initial interaction between the third magnet ring 313 and the fourth magnet ring 333 is broken or released such that the shuttle pin connected with the receptacle pin 441 is moved in the axial direction 101 towards the first and second magnet rings 307, 309.

When the mating operation continues as illustrated in FIG. 10, the shuttle pin 329 is driven back (left in the figure) and the magnetic attraction between the shuttle pin magnet 331 and the front latch magnet 333 is broken. The shuttle pin/receptacle pin are free to move through this mid section of the plug. The sealing 335 is maintained as the sealing 335 is now on the plain diameter of the receptacle pin 441. Once the mating stroke is completed, as is illustrated schematically in FIG. 11, 12, the shuttle pin magnet 313 sits in the magnetic latch area at the rear of the plug. This pulls the shuttle pin 441 and hence receptacle pin to the left, retaining the receptacle within the dummy plug.

Figure 11:
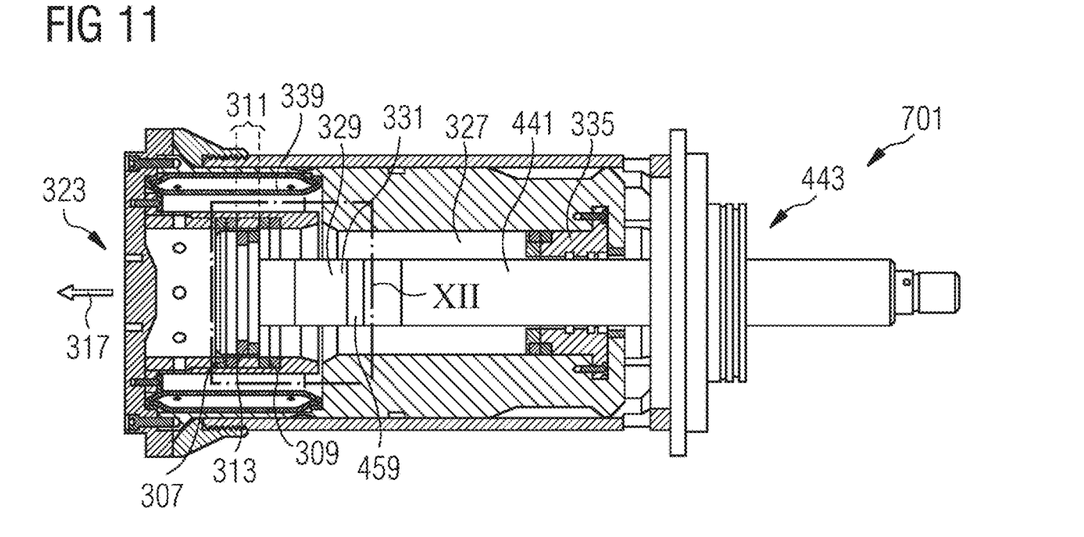
Figure 12:
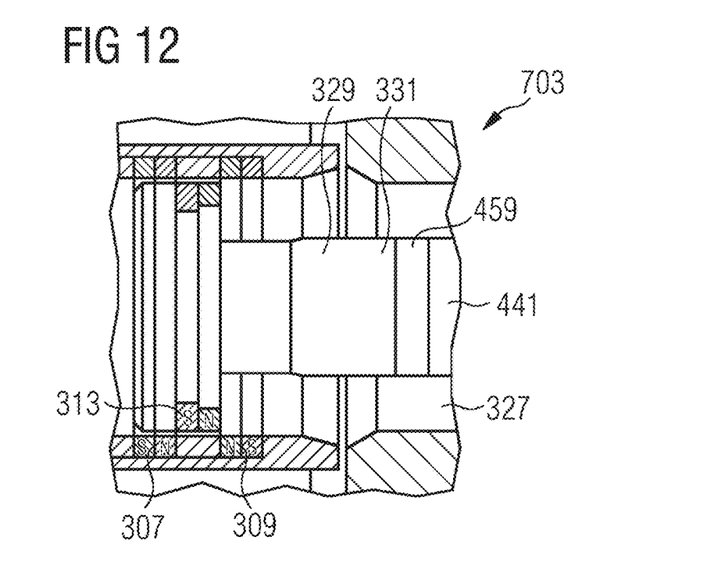

The fully mated state is illustrated in FIG. 11 in a sectional view 701 and in a detailed view 703 in FIG. 12. Thereby, the third magnet ring 313 is in the axial region 311 between the first magnet ring 307 and the second magnet ring 309 and the holding force 317 holds the receptacle pin 441 connected to the shuttle pin 329.

Figure 13:
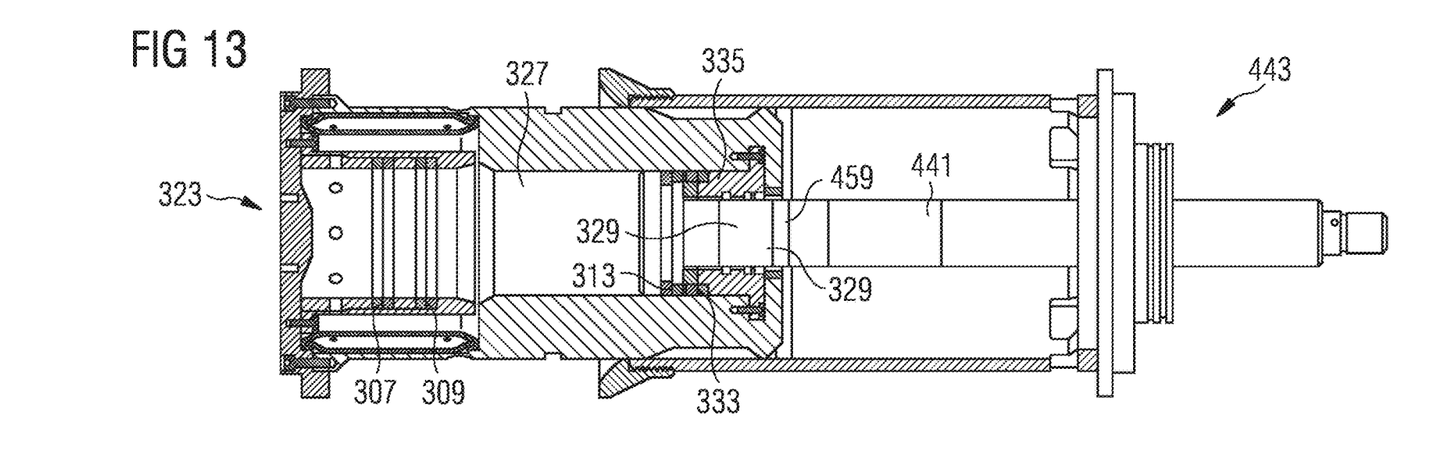
FIGS. 13 and 14 schematically illustrate steps during demating the protective cap illustrated in FIG. 5, 6 from the subsea electrical connector illustrated in FIG. 7, 8.
Figure 14:
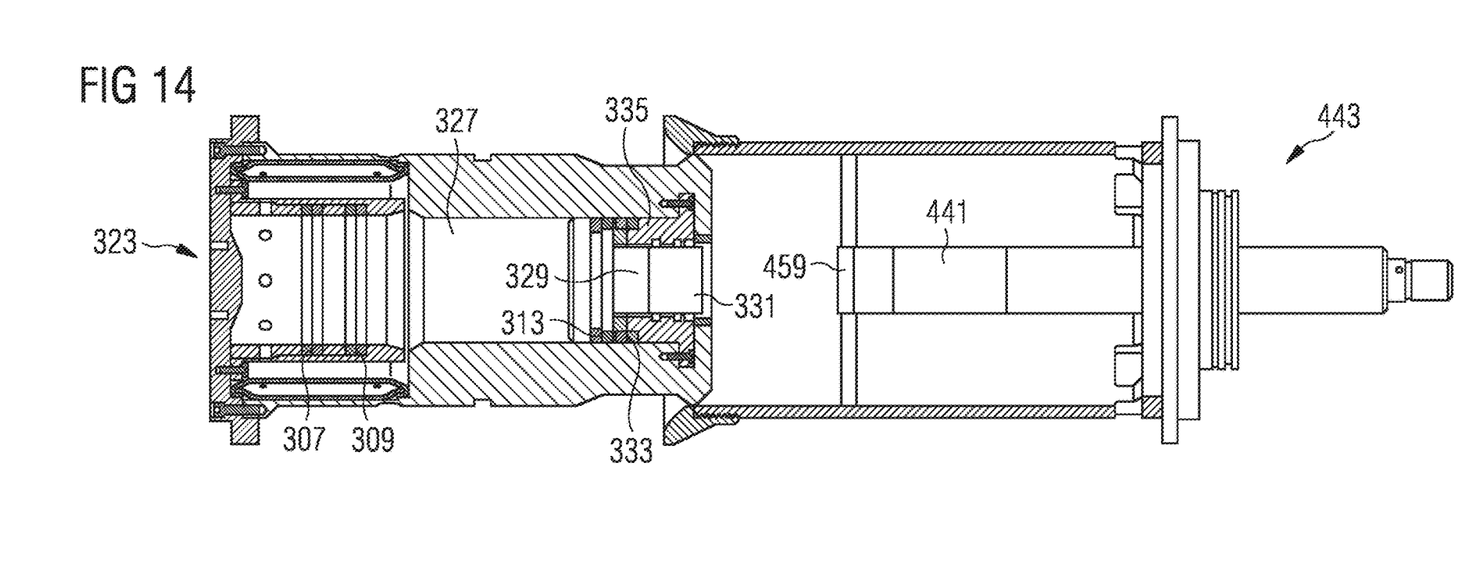

During the demate operation, as is illustrated in FIGS. 13 and 14, when enough force is applied, the shuttle pin 329 is pulled from the rear latch but is still bound to the front of the receptacle pin, in particular bound to the magnetic tip 459 of the receptacle pin 441. The shuttle pin 329 hits the dead stop at the front of the dummy plug and the front latch is re-energized, i.e. the third magnet ring 313 interacts with the fourth magnet ring 333 to hold the shuttle pin 329 in the stop position, i.e. the unmated position. Thereby, the shuttle pin 329 is locked in its front position.

As the receptacle 441 is continued to be pulled out, the magnetic latch between the shuttle pin interaction magnet 331 and the receptacle pin, in particular the magnetic tip 459 is broken. This situation is illustrated in FIG. 14, wherein the dummy plug and the receptacle are now separated. The shuttle pin 329 has sealed the front of the dummy plug retaining the oil for any future mates within the chamber 327.

Figure 15:
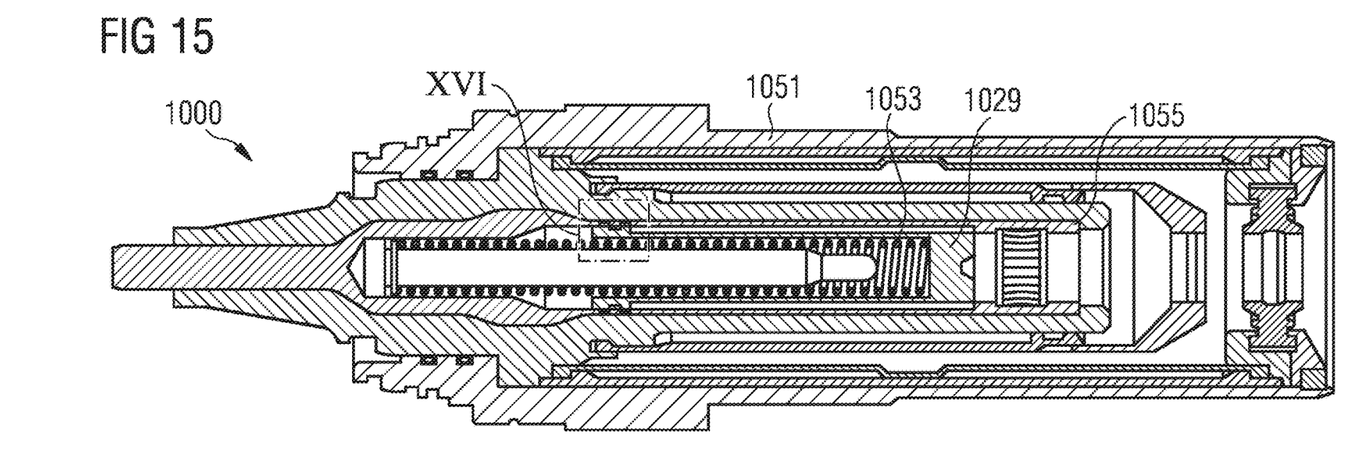
FIG. 15, 16 schematically illustrate in a sectional view a sprung connector member according to an embodiment of the present application.
Figure 16:
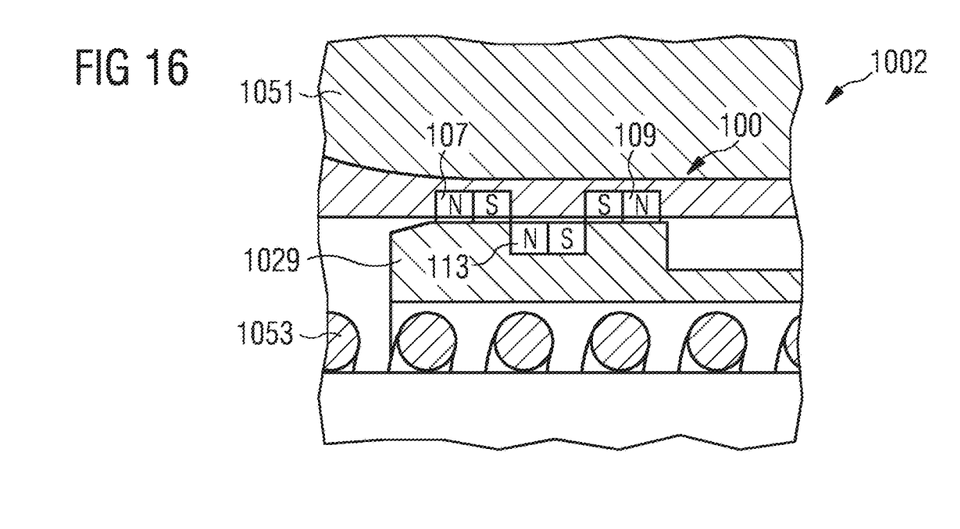

FIG. 15, 16 schematically illustrate a sprung connector member 1000 in a sectional view according to an embodiment of the present invention and in a detailed view 1002. The sprung connector 1000 comprises a casing 1051 and a shuttle pin 1029 for electrical connection translatable within the casing 1051. The sprung connector member 1000 further comprises a coil spring 1053 for biasing the shuttle pin 1029 and further comprises an arrangement for releasable interconnection 100 according to an embodiment of the present invention. Thereby, the arrangement 100 may be configured as is illustrated in FIGS. 1, 2 and 3, 4.

In particular, the arrangement 100 comprises a first magnet ring 107, a second magnet ring 109. Both are fixed on the casing 1051. Fixed at the shuttle pin 1029 is a third magnet ring 1013. Occasionally, a sprung shuttle pin may be used instead of a magnetic shuttle pin. Herein, the shuttle pin 1029 is driven forward by the large spring 1053. In the unmated state, the shuttle pin 1029 is pushed forward (to the right in FIG. 15) through the front seals 1055, sealing the inside of the plug from seawater. When the receptacle is mated, it must compress the spring and as the mating stroke continues, the spring force may increase. When the receptacle is demated, the spring drives the shuttle pin forward again and back through the front seals 1055. The problem with this conventional design is that the sprung force is at a maximum in the fully mated position. The spring force is permanently trying to push the connectors apart and thereby demates them. To overcome this, an external mechanical latch is used to hold them together but if this latch fails, the electrical connection may be lost. Therefore, as is illustrated in FIG. 15, the magnetic latching comprising the first, the second and the third magnet ring is used, to reduce the force exerted by the spring trying to demate the connectors and thereby reduce the load on the external latch, reducing the likelihood of failure.

Figure 17:
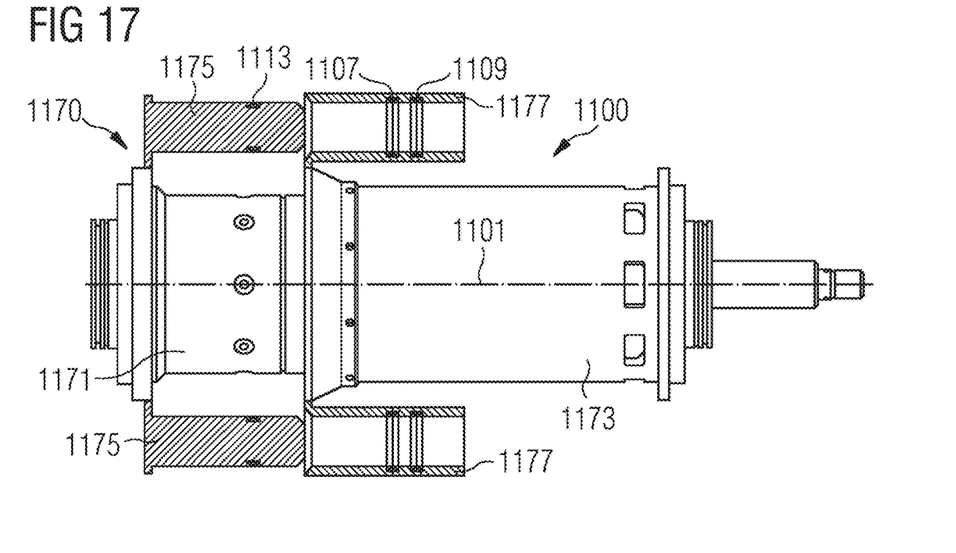
FIGS. 17 to 19 illustrate a subsea connector system according to an embodiment of the present application in FIG. 17 in a demated state and in FIG. 18, 19 in a mated state.
Figure 18:
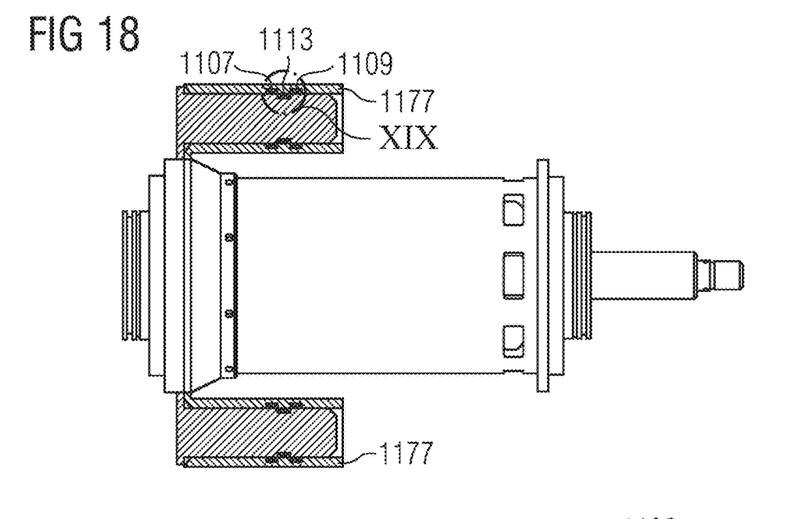
Figure 19:
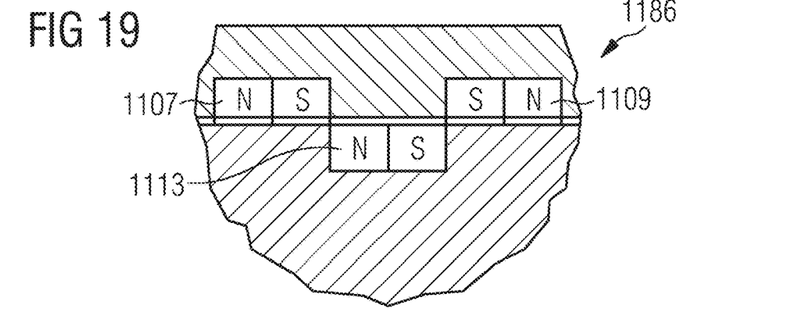

FIGS. 17 and 18, 19 schematically illustrate in a sectional view a subsea connector system 1170 according to an embodiment of the present invention. Thereby, the system 1170 comprises a plug 1171 and a receptacle 1173 which, when mated (as is illustrated in FIG. 18, 19), enable an electrical connection. The subsea connector system 1170 further comprises an arrangement 1100 of releasable interconnection according to an embodiment of the present invention as an external latching system. The arrangement 1100 comprises one or more (e.g. three) rod guides 1175 comprising the third magnet ring 1113. The system 1170 further comprises one or more bore guides 1177 at which the first magnet ring 1107 and the second magnet ring 1109 are fixed. For mating the plug 1171 and the receptacle 1173, they are translated relative to each other in the axial direction 1101 such that the third magnet ring 1113 is arranged axially between the first magnet ring 1107 and the second magnet ring 1109. Thereby, the configuration as illustrated in the detailed view 1180 is reached resembling the arrangement as illustrated in the detailed view 115 of FIG. 1, 2.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. An arrangement for releasable interconnection, comprising:
   an outer ring disposed concentrically about an axis that extends in an axial direction and which comprises an inner diameter; and
   an inner ring that is movable relative to the outer ring along the axial direction and which comprises an outer diameter, the outer diameter being not greater than the inner diameter of the outer ring,
   wherein one of the outer ring and the inner ring includes at least a first magnet ring and a second magnet ring, spaced apart from each other along the axial direction and thereby leaving an axial space therebetween,
   wherein another of the outer ring and the inner ring comprises a third magnet ring,
   wherein the first magnet ring and the second magnet ring are oriented such that a same magnetic pole of the first magnet ring faces a same magnetic pole of the second magnet ring,
   wherein when the third magnet ring is arranged between the first magnet ring and the second magnet ring, substantially in the axial space:
      one pole of the third magnet ring is relatively closer to a same pole of the second magnet ring than to a different pole of the second magnet ring, and
      another pole of the third magnet ring is relatively closer to a different pole of the first magnet ring than to a same pole of the first magnet ring, and
   wherein the same pole of the first magnet ring, the different pole of the first magnet ring, the same pole of the second magnet ring, and the different pole of the second magnet ring occupy different axial positions along the axis.

2. The arrangement of claim 1, wherein a north pole of the first magnet ring and a north pole of the second magnet ring face each other, wherein, when in the axial space, the third magnet ring is arranged such that:
- a north pole of the third magnet ring is relatively closer to the north pole of the second magnet ring than to a south pole of the second magnet ring, and
- a south pole of the third magnet ring is relatively closer to the north pole of the first magnet ring than to a south pole of the first magnet ring.

3. The arrangement of claim 2,
wherein the outer ring includes the first magnet ring and the second magnet ring, and
wherein the inner ring includes the third magnet ring.

4. The arrangement of claim 2, wherein, when the third magnet ring is substantially in the axial space, the third magnet ring is held by a magnet holding force, relative to the first magnet ring and the second magnet ring, pointing in the axial direction from the second magnet ring to the first magnet ring.

5. A cap for protecting a subsea electrical connector, comprising:
- the arrangement of claim 2;
- a substantially cylindrical casing including a chamber fillable with oil, wherein the first magnet ring and the second magnet ring are fixed at the substantially cylindrical casing; and
- a shuttle pin, translatable within the chamber in an axial direction and including at one end an interconnection magnet for interconnection to a pin of a subsea electrical connector, wherein the third magnet ring is fixed at the shuttle pin.

6. The arrangement of claim 1, wherein a south pole of the first magnet ring and a south pole of the second magnet ring face each other, wherein, when in the axial space, the third magnet ring is arranged such that:
- a north pole of the third magnet ring is relatively closer to the south pole of the first magnet ring than to a north pole of the first magnet ring, and
- a south pole of the third magnet ring is relatively closer to the south pole of the second magnet ring than to a north pole of the second magnet ring.

7. The arrangement of claim 6,
wherein the outer ring includes the first magnet ring and the second magnet ring, and
wherein the inner ring includes the third magnet ring.

8. The arrangement of claim 6, wherein, when the third magnet ring is substantially in the axial space, the third magnet ring is held by a magnet holding force, relative to the first magnet ring and the second magnet ring, pointing in the axial direction from the second magnet ring to the first magnet ring.

9. The arrangement of claim 1, wherein the outer ring includes the first magnet ring and the second magnet ring, and wherein the inner ring includes the third magnet ring.

10. The arrangement of claim 1, wherein, when the third magnet ring is substantially in the axial space, the third magnet ring is held by a magnet holding force, relative to the first magnet ring and the second magnet ring, pointing in the axial direction from the second magnet ring to the first magnet ring.

11. A cap for protecting a subsea electrical connector, comprising:
- the arrangement of claim 1;
- a substantially cylindrical casing including a chamber fillable with oil, wherein the first magnet ring and the second magnet ring are fixed at the substantially cylindrical casing; and
- a shuttle pin, translatable within the chamber in an axial direction and including at one end an interconnection magnet for interconnection to a pin of a subsea electrical connector, wherein the third magnet ring is fixed at the shuttle pin.

12. The cap of claim 11, further comprising:
a seal, annularly arranged between the casing and the shuttle pin, to prevent water ingression from outside the cap into the chamber.

13. The cap of claim 12, further comprising:
a diaphragm, partially delimiting the chamber, and arranged to compensate changes of a volume of the chamber, due to movement of the shuttle pin, due to temperature changes, and arranged to pressure compensate the chamber with an outside pressure.

14. The cap of claim 12, further comprising:
a fourth magnet ring, fixed at the casing and arranged to exert, by interaction with the third magnet ring, a holding force to the shuttle pin in a direction from the first magnet ring to the second magnet ring, when the shuttle pin is in an unmated state, not mated/connected with the electrical connector.

15. The cap of claim 11, further comprising:
a diaphragm, partially delimiting the chamber, and arranged to compensate changes of a volume of the chamber, due to movement of the shuttle pin, due to temperature changes, and arranged to pressure compensate the chamber with an outside pressure.

16. The cap of claim 11, further comprising:
a fourth magnet ring, fixed at the casing and arranged to exert, by interaction with the third magnet ring, a holding force to the shuttle pin in a direction from the first magnet ring to the second magnet ring, when the shuttle pin is in an unmated state, not mated/connected with the electrical connector.

17. A system, comprising:
the cap of claim 11, and
a subsea electrical connector member including a pin arranged to interconnect with the interconnection magnet of the shuttle pin of the cap upon contact between the pin and the interconnection magnet of the shuttle pin.

18. The system of claim 17, wherein a holding force between the first magnet ring, the second magnet ring and the third magnet ring is relatively lower than an interconnection force between the shuttle pin of the cap and the pin of the electrical connector member.

19. A sprung connector member for interconnection with another electrical connector member, comprising:
- a casing;
- a shuttle pin for electrical connection translatable within the casing;
- a spiral spring for biasing the shuttle pin; and
- the arrangement of claim 1, wherein the first magnet ring and the second magnet ring are fixed at the casing and wherein the third magnet ring is fixed at the shuttle pin, wherein a holding force between the third magnet ring and the first magnet ring and the second magnet ring, when the third magnet ring is in the axial space, is directed opposite to a spring force acting on the shuttle pin.

20. A subsea connector system comprising:
a plug;
a receptacle; and
the arrangement of claim 1, configured to exert a holding force between the plug and the receptacle when they are mated.

21. A method for establishing a releasable interconnection between: an outer ring disposed concentrically about an axis that extends in an axial direction and which comprises an inner diameter; and an inner ring that is movable relative to the outer ring along the axial direction and which comprises an outer diameter, the outer diameter of the inner ring being not relatively greater than the inner diameter of the outer ring,
wherein one of the outer ring and the inner ring includes at least a first magnet ring and a second magnet ring, spaced apart from each other along the axial direction and thereby leaving an axial space therebetween,
wherein the other of the outer ring and the inner ring comprises a third magnet ring,
wherein the first magnet ring and the second magnet ring are oriented such that a same magnetic pole of the first magnet ring faces a same magnetic pole of the second magnet ring,
the method comprising:
arranging the third magnet ring between the first magnet ring and the second magnet ring, substantially in the axial space such that:
one pole of the third magnet ring is relatively closer to a same pole of the second magnet ring than to a different pole of the second magnet ring, and
another pole of the third magnet ring is relatively closer to a different pole of the first magnet ring than to a same pole of the first magnet ring,
wherein the same pole of the first magnet ring, the different pole of the first magnet ring, the same pole of the second magnet ring, and the different pole of the second magnet ring occupy different axial positions along the axis.

22. The method of claim 21, wherein the method is performed at a bottom of a sea.

23. The method of claim 22, wherein the method involves connecting a protective cap to a connection member having a receptacle pin to be protected from sea water.

* * * * *